United States Patent [19]
Watson

[11] Patent Number: 5,511,269
[45] Date of Patent: Apr. 30, 1996

[54] BATTERY POWERED TILE CLEANING APPARATUS

[76] Inventor: Kay F. Watson, 395 NE. 21st St. #604, Miami, Fla. 33137

[21] Appl. No.: 349,245

[22] Filed: Dec. 5, 1994

[51] Int. Cl.⁶ .............................. A46B 13/02; A46B 5/02; A47L 11/38
[52] U.S. Cl. ................ 15/22.1; 15/28; 15/144.4
[58] Field of Search ................ 15/22.1, 23, 24, 15/28, 29, 97.1, 144.4; 451/356, 359

[56] References Cited

U.S. PATENT DOCUMENTS

| | | | |
|---|---|---|---|
| D. 259,076 | 5/1981 | Doyel . | |
| 1,792,188 | 2/1931 | Robey | 15/23 |
| 3,293,680 | 12/1966 | Wilson | 15/23 |
| 3,570,035 | 3/1971 | Barnett | 15/22.1 |
| 3,688,139 | 8/1972 | Yaguchi | 15/29 |
| 3,828,387 | 8/1974 | Liebscher . | |
| 3,932,908 | 1/1976 | Bitgood | 15/28 |
| 4,131,966 | 1/1979 | Gross | 15/28 |
| 4,202,068 | 5/1980 | Lester | 15/28 |
| 4,217,671 | 8/1980 | Rand | 15/29 |
| 4,344,202 | 8/1982 | Hayat | 15/23 |
| 4,759,091 | 7/1988 | Kiss . | |
| 5,074,004 | 12/1991 | Palton et al. . | |
| 5,211,494 | 5/1993 | Baijnath . | |
| 5,289,605 | 3/1994 | Armbruster | 15/28 |
| 5,353,461 | 10/1994 | Enriquez | 15/28 |

FOREIGN PATENT DOCUMENTS

| | | | |
|---|---|---|---|
| 522174 | 3/1955 | Italy | 15/28 |
| 537509 | 6/1941 | United Kingdom | 15/28 |
| 2249022 | 4/1992 | United Kingdom | 15/28 |

*Primary Examiner*—David Scherbel
*Assistant Examiner*—Randall E. Chin
*Attorney, Agent, or Firm*—David L. Baker; Rhodes and Ascolillo

[57] ABSTRACT

A hand held extendable wand containing a battery power supply and electric motor is controllable and directable by a pistol grip with switches for on-off and speed on one end. A shaft from the motor extends beyond the wand on the other end. Cleaning brushes attach to the motor shaft in one case and a reciprocating motion conversion block containing a shaped brush is attached to the wand housing and motor shaft in another case. The wand contains an adjustable extension to vary the length of reach of the brush.

6 Claims, 4 Drawing Sheets

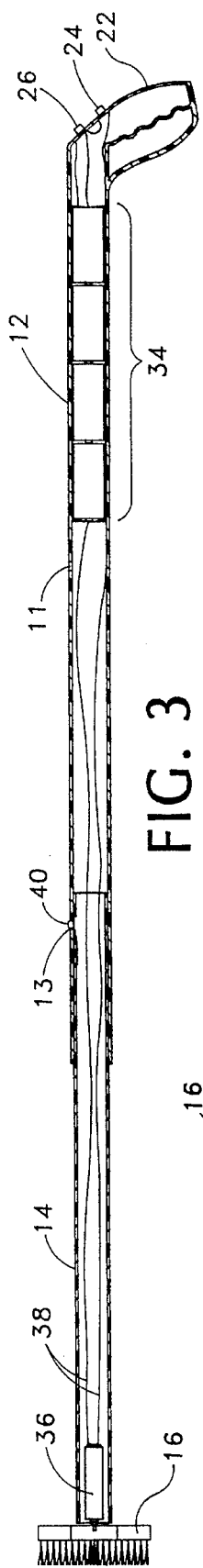
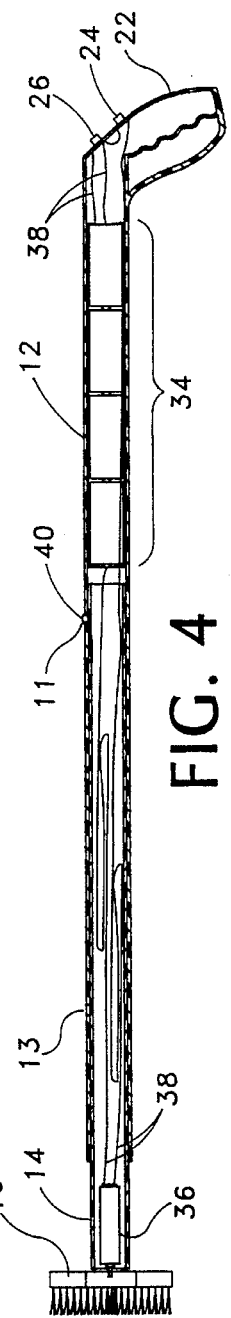
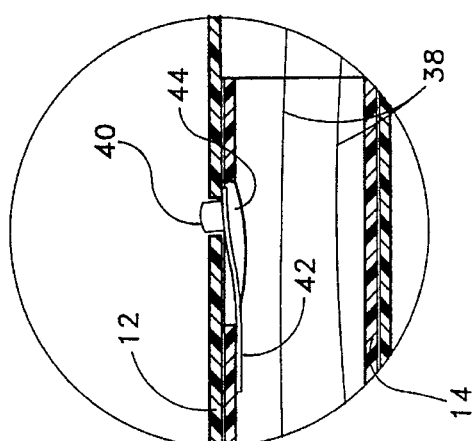
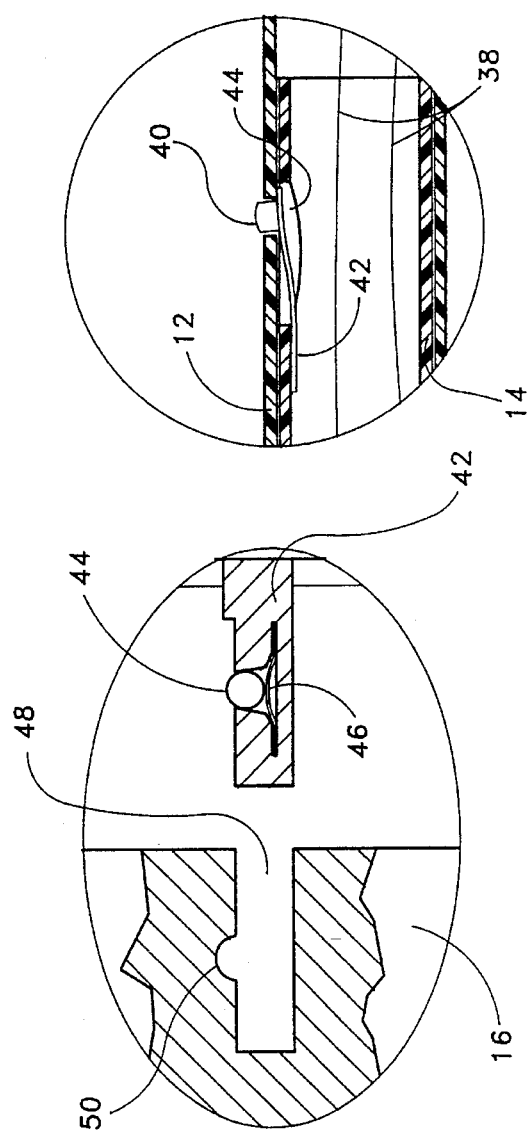
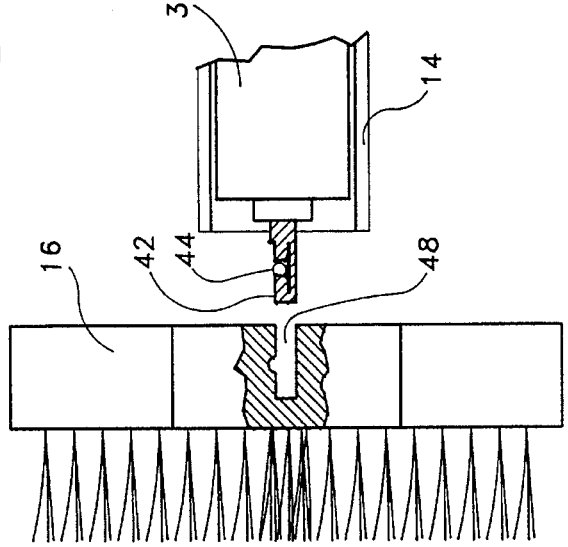
FIG. 3
FIG. 4
FIG. 7
FIG. 6
FIG. 5

BATTERY POWERED TILE CLEANING APPARATUS

BACKGROUND OF THE INVENTION

1. Field of the Invention

The invention relates generally to an apparatus for cleaning the tiles in shower stalls and more particularly to such a device that is battery powered.

2. Description of the Prior Art

The task of cleaning shower tiles is one of the less inviting aspects of homemaking. Along with strenuous chore of scrubbing the tiles and the grout lines there is the additional risk of injury to the back muscles from the leaning and reaching in awkward angles and the danger of slipping and falling on a wet floor.

It is not uncommon to utilize a brush to assist in removing soap scum from the shower walls and tub, particularly where the buildup is substantial. A variety of cleaning brushes have been developed over a period of time that may have an impact on the cleaning apparatus described herein. The brushes and associated apparatus are shown and disclosed in U.S. Patents. For example, U.S. Pat. No. 3,828,387 issued Aug. 13, 1974 to Liebscher discloses a form of rotatable cleaning brush that is used in a vacuum cleaning apparatus. A design patent, U.S. Design Pat. No. Des. 259,076 issued May 5, 1981 to Doyel, shows a hand held battery-operated brush and scrubber. A personal brush for use in a shower is disclosed in U.S. Pat. No. 4,759,091 issued Jul. 26, 1988 to Kiss where the brush is attached to the shower door and the user applies parts of his or her body to the brush. A swimming pool tile cleaning apparatus is shown in U.S. Pat. No. 5,074,004 issued Dec. 24, 1991 to Patton et al.. The patent discloses, in FIGS. 1 and 2 prior art tile cleaning apparatus that are separate and distinct from the device claimed by Patton et al.. U.S. Pat. No. 5,211,494 issued May 18, 1993 to Baijnath discloses another type of personal bath brush designed for stimulating the skin as well as loosening and removing dirt from the body.

The prior art fails to show a battery powered brush of the type that will allow the user to avoid back muscle injury and slips and falls on wet shower room floors.

SUMMARY OF THE INVENTION

The invention is directed to a battery powered brush for cleaning shower stalls and tub enclosures that include tile walls as well as walls formed from other materials such as fiberglass, for example. A feature of the invention is a long wand that has a pistol grip handle on one end for holding the apparatus with an extendable section that allows the user to reach the hard to get to places. A variety of brushes are capable of attachment to the end of the wand opposite from the hand grip. For balance and weight reduction the batteries are mounted within the wand near the hand grip, while the direct current motor is located within the wand, near the brush on the working end. The motor is controlled by switches in the grip, two switches are provided, on-off and fast-slow. The motor is connected to the batteries by wires internal to the wand. In one embodiment the brush simply snaps on the motor shaft extension and rotates with the motor, while in another embodiment an adapter attaches to the wand and the brush is provided with a reciprocating motion for particularly cleaning grout lines.

It is therefore an object of the invention to provide a new and improved tile cleaning apparatus.

It is another object of the invention to provide a new and improved cleaning apparatus that is efficient and easy to use.

It is a further object of the invention to provide a new and improved cleaning apparatus that reduces the risk of injury to the user.

It is still another object of the invention to provide a new and improved cleaning apparatus that utilizes a variety of brushes.

It is still another object of the invention to provide a new and improved cleaning apparatus that may be assembled from low cost currently available parts.

These, together with other objects of the invention, along with the various features of novelty which characterize the invention, are pointed out with particularity in the claims annexed to and forming a part of this disclosure. For a better understanding of the invention , its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a left side elevational view, cut away, showing the wand extended.

FIG. 4 is a left side elevational view, cut away, showing the wand retracted.

FIG. 5 is a left side elevational view, partly in section, showing the motor shaft and brush connection.

FIG. 6 is an enlarged view of FIG. 5.

FIG. 7 is an enlarged view of the wand extension securing stud.

DETAILED DESCRIPTION OF A PREFERRED EMBODIMENT

Figure 1:
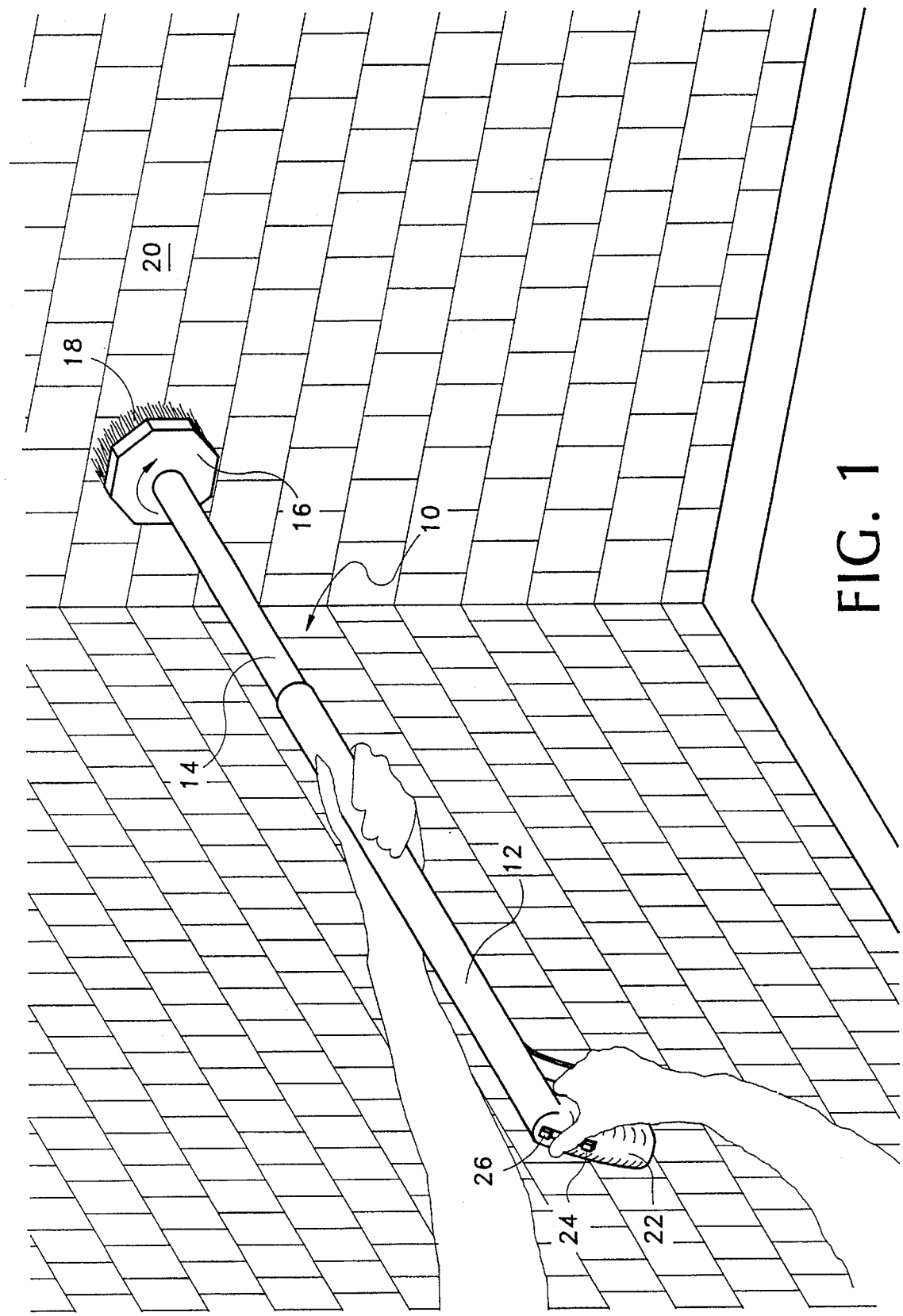
FIG. 1 is an environmental view of the invention.

Referring now to FIG. 1, the invention is shown generally at 10. The invention consists of a wand 12, with an extension 14 including a rotatable brush 16. The bristles 18 of the brush are shown engaging the tiles on the shower stall wall 20. The wand is grasped and controlled by a pistol grip style handle 22 containing electrical control switches 24, 26 for on-off and high-low speed. The wand may be also grasped mid shaft if desired or necessary for additional directional control. Force control is exerted through the handle 22.

Figure 2:
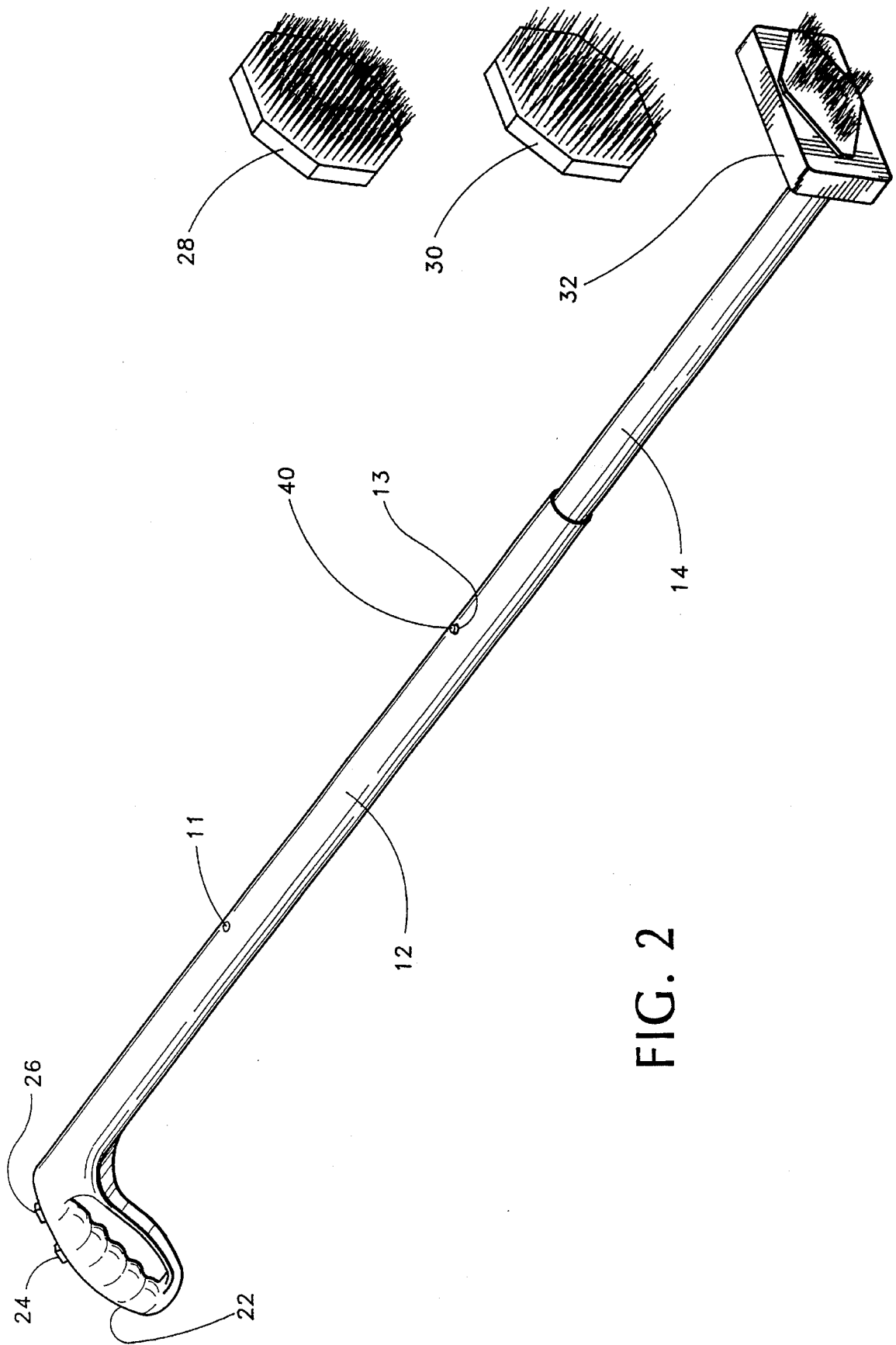
FIG. 2 is a perspective view of the invention.
Figure 8:
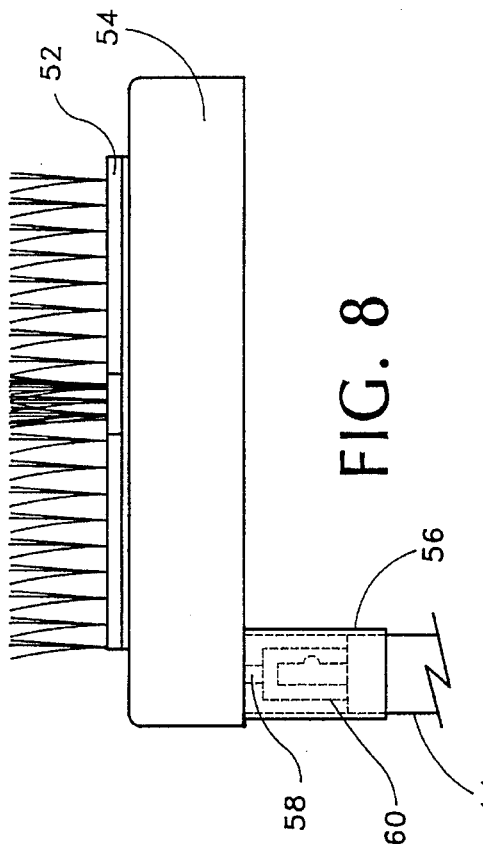
FIG. 8 is a left side elevational view of the grout brush and reciprocating system.

FIG. 2 illustrates the invention in perspective. The wand 12 is shown with grip 22 at one end and extension 14 at the opposed end. Apertures 11 and 13 in wand 12 accept a spring biased detent 40 for controlling the position of the extension 14. The extension 14 translates along the longitudinal axis of the wand 12 concentric within the wand, and locks into place, extended or retracted, by means of apertures 11, 13 and detent 40. Brush 28 is shown as a soft bristle brush for light scum and polishing, brush 30 is a stiff bristle brush for heavy duty cleaning and scouring. Brush 32 is a grout brush and includes a reciprocating cross shaped bristle pattern, along a primary axis and secondary axis as shown in FIG. 2, that is specifically designed to attack dirt and mildew in the grout seams of the tile.

Concerning FIGS. 3 and 4, the wand 12 is shown with handle 22 containing a representative power supply of batteries 34 connected to switches 24,26 and thence to direct current electric motor 36 via wires 38 designed for the purpose. In FIG. 3, the extension 14 is extended with detent 40 engaging aperture 13. In FIG. 4, the extension 14 is retracted with detent 40 engaging aperture 11. FIG. 7 provides the detail of the detent system with the detent stud 40 affixed to a flat spring 42 at one end. The spring is affixed to the interior wall of the extension 14 and projects through an aperture 44 in the extension wall. In order to release the detent, pressure is applied to the exposed top and the extension translated, causing the stud to ride along the interior wall of the wand 12 until it reaches the next aperture. It is within the scope of the invention to place multiple detent receiving apertures in the wand thereby providing for multiple adjustment features for the extension.

FIGS. 5 and 6 show the connection arrangement between the motor 36 and the typical brush 16. The motor has extending therefrom a rotatable shaft 42 containing a ball 44 biased by spring 46. Brush 16 contains a centrally located aperture 48 that is sized and dimensioned to mate with shaft 42 including a recess 50 adapted to receive ball 44. The brush is placed or displaced by simply pushing or pulling the brush over the spring biased ball 44 on the motor shaft.

An alternative apparatus is used for the grout brush where a reciprocating motion has been found to best clean the seams between the tiles. The grout brush 52 is mounted on a block 54. The block is mounted on the extension 14 by means of an overlapping sleeve 56 having an interference fit with the extension. A cam shaft 58 extends from the block 54 within the sleeve 56. A coupling 60 is permanently attached to the shaft 58 and is adapted to receive the motor shaft 42.

Figure 11:
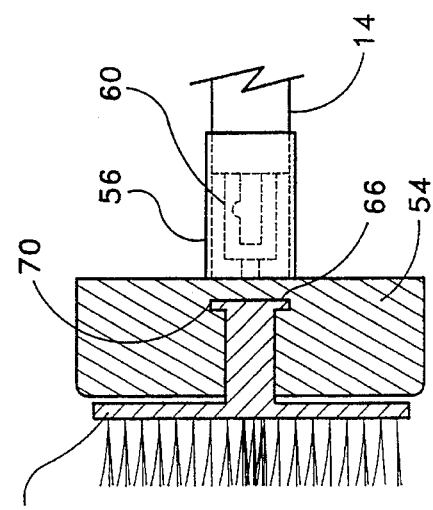
FIG. 11 is a cross sectional view of the invention taken along lines 11—11 of FIG. 10.
Figure 9:
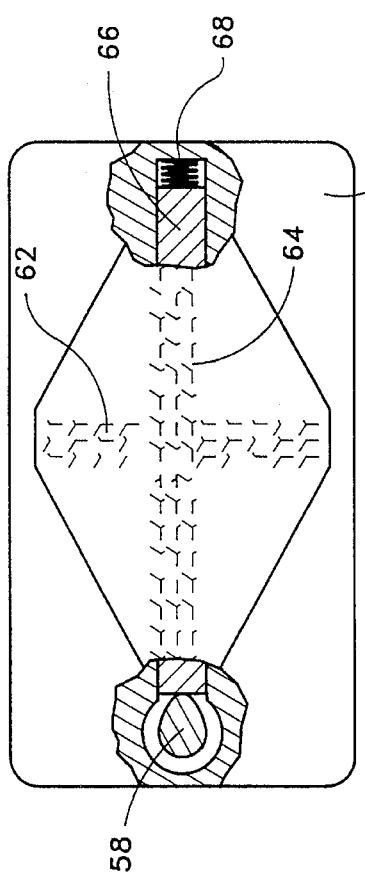
FIG. 9 is a top plan view, partially cut away, showing the reciprocating system, spring compressed.
Figure 10:
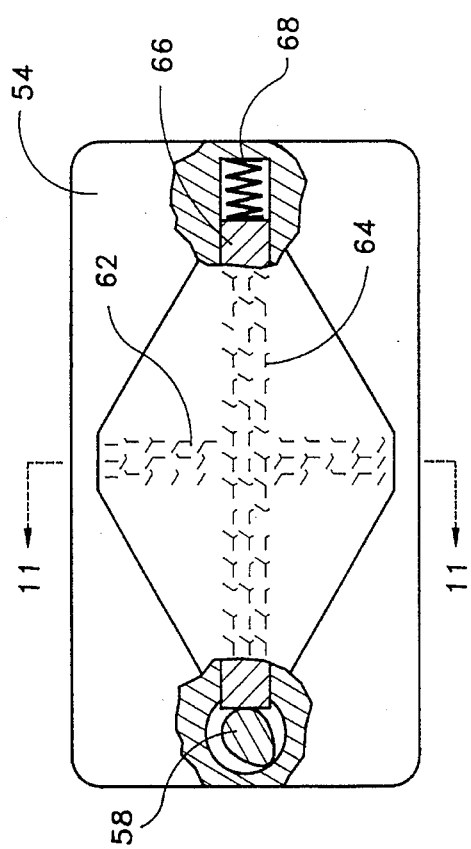
FIG. 10 is a top plan view, partially cut away, showing the reciprocating system, spring expanded.

FIGS. 9, 10 and 11 detail the operation of the grout brush. FIGS. 9 and 10 show a top view of the brush cut away at the ends of the stroke for the brush extension. The bristles for the brush are shown at 62 and 64. The brush backer extension 66 rides in a groove in the block 54. Reciprocating movement is caused by the rotation of the cam shaft 58 driving the extension 66 against the bias of spring 68. FIG. 9 shows the cam compressing spring 68 and FIG. 10 shows the cam lobe away from the extension and spring 68 relaxed. FIG. 11 shows the brush backer extension 66 riding in a T-shaped groove 70 in the block 54.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A battery powered tile cleaning apparatus comprising:

a tubular wand having two ends;

a means for grasping and directing on one of said ends of said wand;

said means for grasping and directing comprising a pistol grip;

an opening on the other of said ends of the wand;

a tubular wand extension having two ends and being concentrically located within and telescopingly connected to the wand;

the wand extension being axially translatable through the opening of the wand into extended and retracted positions;

motor means, comprising a direct current electric motor, positioned within the wand extension at the end of the wand extension distal from the means for grasping and directing;

a shaft means, attached to the motor means, extending beyond the end of the wand extension distal from the means for grasping and directing;

means for activating said motor means, said means for activating positioned in the wand and comprising at least one battery;

means for connecting the activating means and the motor means, said motor means comprising:

an on-off switch; and a slow-fast switch connected to the on-off switch;

means for cleaning operatively attached to the shaft means;

means for releasably locking the wand extension in the extended and retracted positions;

means, engaging said shaft means, for causing reciprocating motion of the means for cleaning; a spring biased ball mounted in the shaft means for operatively connecting the means for causing reciprocating motion to the shaft means.

2. A battery powered tile cleaning apparatus according to claim 1 wherein the means for cleaning is a brush.

3. A battery powered tile cleaning apparatus according to claim 2 wherein the brush is formed of stiff bristles.

4. A battery powered tile cleaning apparatus according to claim 2 wherein the brush is formed of soft bristles.

5. A battery powered tile cleaning apparatus according to claim 2 wherein the brush further contains a first line of bristles along a primary axis and a second line of bristles along a secondary axis transverse to the primary axis.

6. A battery powered tile cleaning apparatus according to claim 1 wherein the means for causing reciprocating motion of the means for cleaning includes:

a stationary block;

a rotating cam within the stationary block, connected to the shaft means;

a groove in the stationary block;

a brush backer extension, in said groove, slidingly activated by said rotating cam, said brush backer extension being connected to said means for cleaning; and a spring, in said groove distal the cam, biasing said brush backer extension back towards the cam.

* * * * *